United States Patent
Glavach et al.

(10) Patent No.: US 7,487,003 B1
(45) Date of Patent: Feb. 3, 2009

(54) AUTOMATIC TRACKING OF A LOT OF ITEMS THROUGH VIRTUAL SUBLOTS

(75) Inventors: Mark A. Glavach, Slippery Rock, PA (US); John T. Campbell, Jr., Bridgeville, PA (US); Scott A. Miller, Oakdale, PA (US); Keith A. Overstreet, Pittsburgh, PA (US); Randall P. Sadowski, Hookstown, PA (US); David T. Sturrock, Evans City, PA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/371,414

(22) Filed: Mar. 9, 2006

(51) Int. Cl.
*G06F 19/00* (2006.01)

(52) U.S. Cl. .................. 700/115; 700/96; 700/99; 700/108; 700/219; 700/223

(58) Field of Classification Search ............ 700/96, 700/99–104, 106, 108, 115, 116, 121, 219, 700/223, 224; 340/572.1, 568.1
See application file for complete search history.

(56) References Cited

U.S. PATENT DOCUMENTS

| | | | |
|---|---|---|---|
| 5,255,181 A * | 10/1993 | Chapman et al. ............... 705/8 |
| 5,444,632 A | 8/1995 | Kline et al. |
| 5,446,671 A | 8/1995 | Weaver et al. |
| 5,696,689 A * | 12/1997 | Okumura et al. ............ 700/121 |
| 5,721,686 A | 2/1998 | Shahraray et al. |
| 5,751,581 A * | 5/1998 | Tau et al. ..................... 700/115 |
| 5,828,989 A * | 10/1998 | Zvonar et al. ............... 702/188 |
| 5,831,859 A * | 11/1998 | Medeiros et al. ............ 700/218 |
| 5,841,677 A | 11/1998 | Yang et al. |
| 5,856,923 A * | 1/1999 | Jones et al. ................. 700/121 |
| 5,889,674 A * | 3/1999 | Burdick et al. .............. 700/121 |
| 6,289,252 B1 * | 9/2001 | Wilson et al. .................. 700/7 |
| 6,463,348 B1 * | 10/2002 | Takechi et al. .............. 700/115 |
| 6,473,721 B1 | 10/2002 | Chacon et al. |
| 6,662,065 B2 | 12/2003 | Matsumoto |
| 6,978,187 B1 | 12/2005 | Ryskoski |
| 7,218,980 B1 * | 5/2007 | Orshansky et al. ............ 700/99 |
| 2004/0210340 A1 * | 10/2004 | Koike et al. ................. 700/213 |

* cited by examiner

*Primary Examiner*—Sean P Shechtman
(74) *Attorney, Agent, or Firm*—Amin Turocy & Calvin LLP; William R. Walbrun

(57) ABSTRACT

A system that tracks a lot of items being manufactured comprises a receiver component that receives control logics for manufacturing the lot, the control logics include information relating to number of items within the lot and number of items within sublots. A partitioning component automatically creates a plurality of virtual sublots that represent sublots being manufactured. A tracking component automatically tracks each of the sublots across multiple processes during manufacture of the items and associates tracking data with corresponding virtual sublots.

32 Claims, 12 Drawing Sheets

AUTOMATIC TRACKING OF A LOT OF ITEMS THROUGH VIRTUAL SUBLOTS

TECHNICAL FIELD

The claimed subject matter relates generally to tracking products in an industrial environment and, more particularly, to automatically tracking a lot of items through multiple industrial processes.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

As can be discerned from the above, a substantial amount of data can be generated in an industrial automation environment with respect to controlling and maintaining an industrial process. Additionally, with tagging devices, such as barcodes and Radio Frequency Identifier tags (RFID tags) becoming more affordable and more prevalent, massive amounts of data relating to items being manufactured can be generated. For example, through employment of RFID tags, location, identification, and other information can be uniquely associated with each item. Thus, if desired, data can be collected and analyzed regarding each item that is being manufactured. Moreover, metadata can be associated with each item as an item is being manufactured. For instance, it may be desirable to know a time that a certain product was in a particular location. Similarly, name of an operator associated with the product can be associated with the product at particular times. Thus, it is apparent that an extremely granular amount of data can be associated with each item being manufactured.

Typically, however, such granularity in tracking items during manufacturing is not desired. In a specific example, thousands of items can be created in a manufacturing facility in a single day. Accordingly, creating and retaining data for each individual item would generally be counterproductive, as it would be extremely difficult to extract meaningful information from such a vast amount of data. Additionally, expense would be incurred in storing the data, since over a short period of time enormous amounts of data can be generated. Therefore, often it is desirable to group items into lots of items and track such lots during manufacturing of items within the lots. A size of the lots (e.g., a number of items within the lots), for example, can be based upon a work order for a particular client. Therefore, it is desirable to track such lot for billing and inventory purposes with respect to the client without commingling tracking data with data relating to other lots.

Most items require several processes to be undertaken in sequence to enable manufacture of the items. For example, manufacturing a bag of potato chips requires steps of receiving potatoes, skinning the potatoes, slicing the potatoes, frying the resulting chips, removing the chips from the fryer and allowing the chips to dry, separating the chips into portions of a desired size, and packaging the chips. Therefore, a single lot of potato chips may be spread over numerous processes. Conventionally, there is no mechanism for tracking lots of items across several processes. Rather, a lot of a particular size is released, and an operator manually splits the lot into individual lots for control purposes (e.g., to control individual processes). Each of these individual lots must then be tracked and identified by the operator as they pass through different processes. Once the lot is complete (e.g., each item within the lot has passed through relevant processes), the operator must manually recombine data associated with each of the individually created sublots.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Tracking a lot of items through a factory can be a difficult and error-prone task, as conventionally operators must manually track sublots as they traverse through a factory. It can be discerned that such manual tracking can be associated with numerous errors, as an operator may forget to mark when a sublot has completed a certain process, errors can be made during aggregation of data, and the like. To aid in reducing errors, a control system can be analyzed to determine a size of a lot. The control system can additionally be monitored to determine a size of sublots that are to be created to effectuate manufacture of the lot of items. For instance, a work order can indicate that several lots of a thousand items are desirably manufactured, wherein several disparate processes must act sequentially to enable manufacture of such items. At least one of the processes may only have capabilities to process materials that are associated with a hundred items—accordingly, a plurality of sublots (e.g., one hundred items) must be created and sequentially released for processing. By analyzing the control system, a number of sublots that are to be created and a size of such sublots can be determined.

Upon determining parameters relating to the sublots, a plurality of virtual sublots that correspond to sublots on a factory floor can be automatically created. Data can be generated relating to a sublot on the factory floor from sensors, and such data can be associated with a virtual sublot that corresponds to the sublot on the factory floor. For instance, it can be sensed that a process utilizes particular amounts of separate chemicals during a process involved in the manufacture of a pharmaceutical. This sensed data can then be associated with the virtual sublot, such that one analyzing the virtual sublot can easily discern the amount of chemicals utilized in the specific process with respect to the sublot corresponding to the virtual sublot. Any suitable data generated in association with a sublot on a factory floor can be related to a corresponding virtual sublot. For instance, inventory of particular materials, timing information, operators associated with the sublots, and the like can be included within the virtual sublots. Such tracking of data with respect to the sublots can enable creation of genealogy data, audit logs, and the like.

To enable robust tracking of sublots through multiple processes, a determination can be made regarding when processes are complete with respect to a sublot and when a new process is associated with the sublot. In a completely automated system, the control system can be analyzed to automatically determine when processes have been initiated and/or completed with respect to particular sublots. Pursuant to a disparate example, operators can indicate when processes have been initiated or completed. It is understood, however, that any suitable manner for determining when processes initiate/complete is contemplated by the inventors and intended to fall under the scope of the hereto-appended claims.

Once the lot of items has been manufactured (e.g., each sublot has been associated with a certain process), data within the virtual sublots can be aggregated. For example, temperature associated with a heating process with respect to each sublot can be aggregated to determine a mean temperature, a median temperature, and a distribution with respect to the lot. Pursuant to another example, amounts of materials utilized in processing the sublots can be aggregated to indicate amounts of materials utilized for manufacture of the lot of items. After the data has been aggregated, the virtual sublots can be automatically deleted. Accordingly, a robust automatic tracking system is provided.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
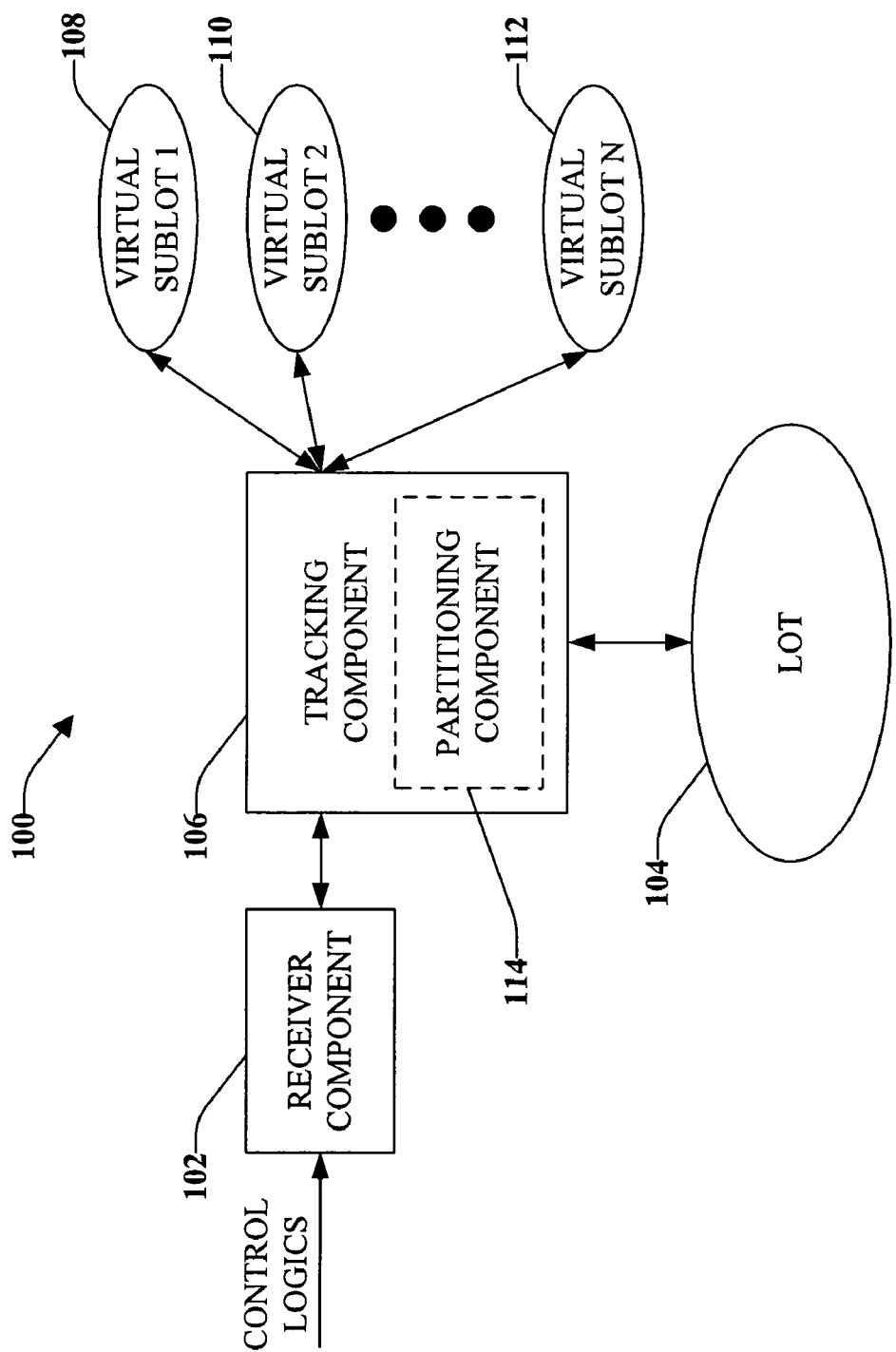
FIG. 1 illustrates a system that facilitates automatic tracking of a lot of items through a factory.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Of course, those skilled in the art will recognize many modifications may be made to this configuration without departing from the scope or spirit of what is described herein.

Now referring to the drawings, FIG. 1 illustrates an industrial tracking system 100 that can be utilized to automatically track a lot of items as it traverses through an industrial environment (e.g., a factory floor). The system 100 includes a receiver component 102 that receives control logics that are utilized to control at least partial manufacture of a lot of items 104. In a particular example, the control logics received by the receiver component 102 can effectuate preparing, mixing, and packaging a pharmaceutical product. The lot of items 104 may refer to an arbitrary number of items, a number of items described in a work order, or any other suitable number of items, and can be included within the control logics.

Upon the receiver component 102 receiving the control logics, the lot of items 104 can be released. In other words, process(es) to be undertaken upon the items within the lot of items 104 to enable at least partial manufacturing thereof can be initiated. A tracking component 106 can be provided to automatically perform tracking with respect to the lot of items 104. For instance, amount(s) of raw materials utilized during processing of the lot of items 104, timing associated with the processes, amounts of additives utilized in connection with processing the lot of items 104, etc can be monitored and tracked by the tracking component 106. In a detailed example, during the manufacture of a pharmaceutical, it is imperative to track amounts of disparate materials that are utilized, as incorrect amounts of particular elements of the pharmaceutical can result in serious illness or even fatality with respect to eventual consumers of the pharmaceutical. Several sequential processes, however, may be required to manufacture the lot of items 104, wherein at least one of the processes is not capable of acting upon materials associated with each item within the lot of items 104. For instance, the lot of items 104 may be defined as a thousand items, while a process required to manufacture the lot of items 104 may only be capable of simultaneously processing materials relating to one hundred items.

Thus, the lot of items 104 can conceptually be considered a plurality of sublots of items, wherein a size of the sublots can be based at least in part upon capabilities of processes utilized to manufacture the lot of items 104. For example, if the lot size is one thousand, and maximum capacity for a particular process is one hundred items, the lot 104 can be partitioned into sublots of one hundred. In still more detail, a process associated with one hundred items can be initiated, and upon the initial process completing, results of the process (the sublot) can be transported to another process. In the meantime, the initial process can be run again with respect to another sublot. Conventionally, to track manufacture of the lot of items 104 through a factory, an operator or operators must manually partition the lot into sublots of appropriate size, track each sublot through the factory, determine which data is desired with respect to the sublots, recombine the data after each item within the lot of items 104 has finished a particular (e.g., final) process, delete the sublots, and the like. The tracking component 106, however, can analyze the control logics and automatically create a plurality of virtual sublots 108-112 that correspond to sublots on the factory floor. In more detail, the tracking component 106 can include a partitioning component 114 that creates the plurality of virtual sublots 108-112 based upon the received control logics. Thus, if in actuality the lot of items 104 must be broken into ten sublots to enable manufacture of the lot of items 104, the tracking component 106 can determine such need and the partitioning component 114 can automatically create ten virtual sublots that are to be tracked.

Thereafter, the tracking component 106 can track data with respect to each sublot on the factory floor by way of the plurality of virtual sublots 108-112. Therefore, as sublots traverse through a factory, the tracking component 106 can receive data and associate such data to appropriate virtual sublots. As described above, information to be tracked can include raw materials employed in processes with respect to sublots, location of sublots represented by the virtual sublots 108-112, amount of mixing time associated with an item, operators associated with the virtual sublots 108-112, and any other suitable data that may need to be tracked. For instance, in certain food or drug processing applications, certain data must be tracked to conform to requirements imposed by federal, state, and/or local agencies. The tracking component 106 can automatically track such data through utilization of the partitioning component 114 that automatically creates the virtual sublots 108-112 such that the tracking component 106 can perform tracking with respect to sublots on the factory floor.

Figure 2:
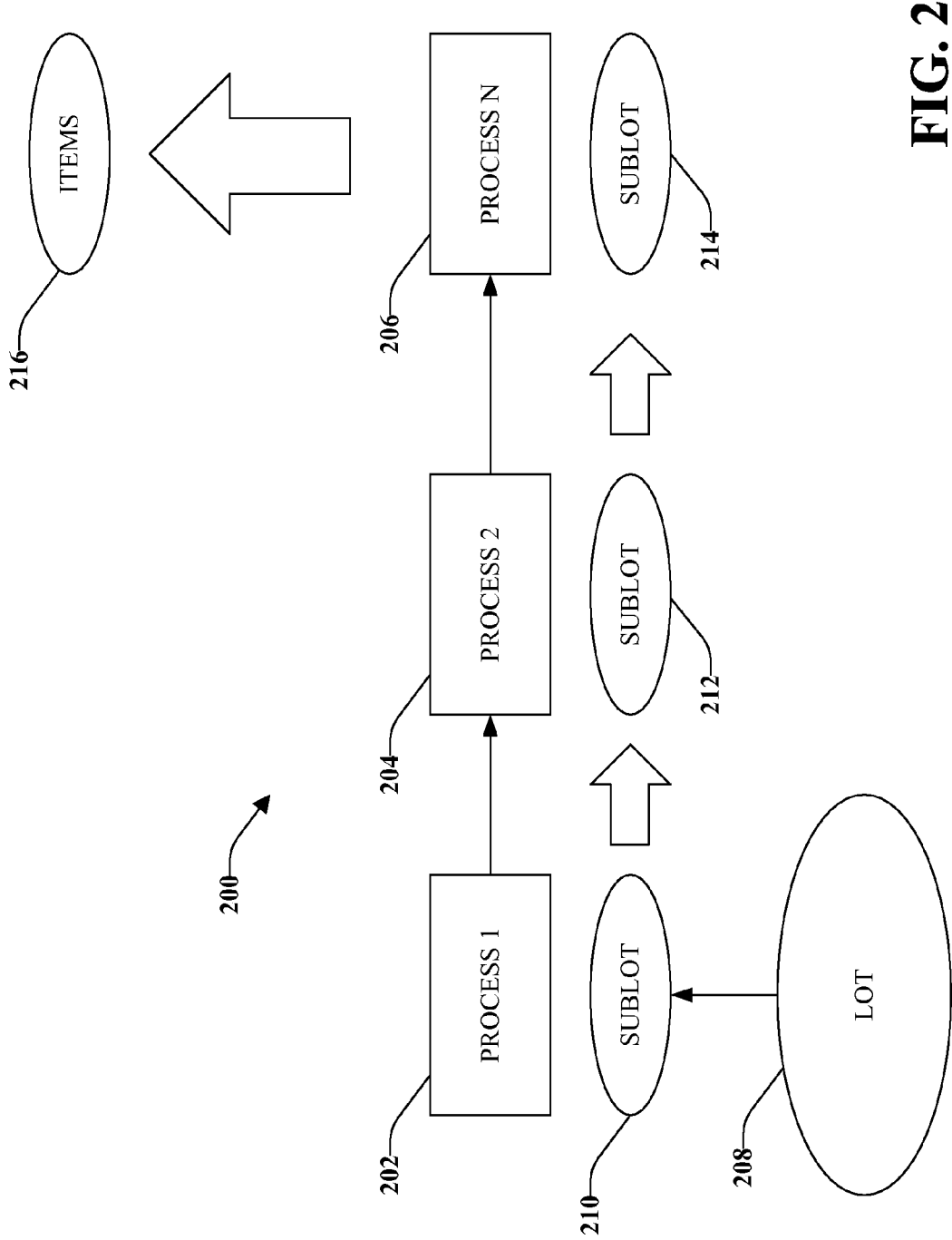
FIG. 2 illustrates a manufacturing line that includes several processes and sublots associated therewith.

Turning now to FIG. 2, an industrial system 200 is illustrated, wherein the system 200 includes multiple processes that are necessary to manufacture items. More particularly, the system 200 includes multiple processes 202-206 that operate sequentially to manufacture items, wherein at least one of the processes 202-206 is associated with limited bandwidth with respect to output. For example, the process 204 may be a mixing operation that can mix only a certain amount of material at any point in time (e.g. lack of mixing power, size of a mixing container, . . . ). A size of a lot 208 that is desirably tracked, however, may exceed capacity of one or more of the processes. In more detail, it may be desirable to track a work order, where the work order calls for manufacture of a large number of items. As one or more of the processes 202-206 is incapable of concurrently performing processing with respect to an entirety of the lot 208, however, the lot 208 must be partitioned into a plurality of sublots. Similarly, even if each of the processes 202-206 has the capacity to perform processing with respect to the entirety of the lot 208, throughput may be negatively affected, rendering it desirable to partition the lot 208 into several sublots. The sublots can then be sequentially provided to the processes 202-206 to increase throughput and enhance manufacturing efficiency.

In a particular example, when initiating manufacture of the lot 208 (e.g., releasing the lot), the process 202 can be configured to perform processing with respect to a sublot 210 of a particular size. Upon the process 202 completing with respect to the sublot 210, such sublot 210 can be passed to a next process in a sequence (the second process 204). Thereafter the process 202 can perform operations with respect to another sublot 212. Upon the first and second processes 202 and 204 completing with respect to the sublots 210 and 212, respectively, the sublots 210 and 212 can be provided to next processes in the sequence and the process 202 can begin operation with respect to a sublot 214. This sequential processing eventually leads to manufacture of the lot 208. While for illustrative purposes the lot of items 208 and the sublots 210-214 are displayed as tangible entities, it is understood that the sublots 210-214 may be intangible until processing commences. In a specific example, the lot of items 208 can be a request for a thousand bottles of a particular pharmaceutical. As the pharmaceutical has not begun processing at a time of receipt of the work order, it is apparent that a certain number of such pharmaceutical is not released to the first process 202. Rather, for instance, the first process 202 can be a mixing operation where a certain amount of raw materials are provided to a mixer for mixing. The second process 204 can relate to heating the mixed materials, and the Nth process 206 can include adding additional materials to the heated mixture, cutting the mixture, or any other suitable process. Therefore, once each sublot has been processed by the processes 202-206, resulting items 216 should correspond to the lot of items 208.

As stated above, it is often desirable and/or necessary to perform tracking with respect to the lot of items 208 to ensure that resulting items 216 meet particular standards. The partitioning component 114 (FIG. 1) can be employed to automatically create several virtual sublots that correspond to sublots on the factory floor, and the tracking component 106 can track the sublots 210-214 as they are processed by the processes 202-206. Continuing with the above example, the tracking component, with respect to the sublot 210, can track amounts of raw materials utilized in the mix at the first process 202, track temperature ranges and times at the second process 204, and can track cutting of the materials and the like at the Nth process 206. Therefore, the partitioning component 114 can automatically create a plurality of virtual sublots and the tracking component 106 can automatically track sublots corresponding thereto as the sublots traverse through a factory.

Figure 3:
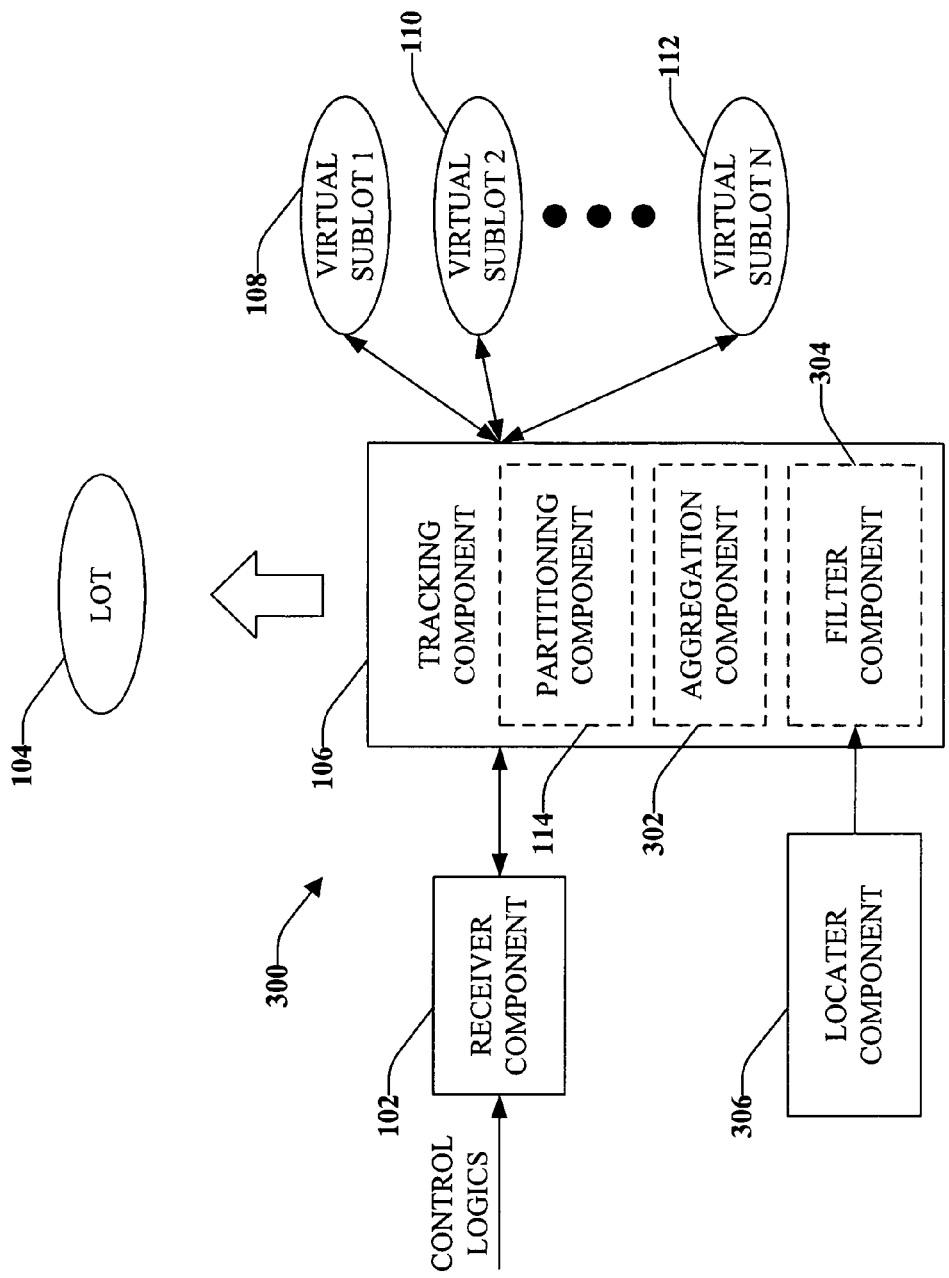
FIG. 3 illustrates an automatic tracking system in a manufacturing environment that can filter data based upon location of items being manufactured.

Referring now to FIG. 3, an automatic tracking system 300 with respect to a lot of items is illustrated. The system 300 includes the receiver component 102 that receives control logics and the partitioning component 114 that analyzes the control logics to determine a size of a lot 104 and automatically creates the plurality of virtual sublots 108-112 based at least in part upon the analysis. The tracking component 106 can then track each sublot represented by the virtual sublots 108-112 as the sublots pass through various processes, wherein tracking relates to collecting and organizing data relevant to the sublots, such as raw materials utilized in connection with each of the sublots, temperatures associated with each of the sublots, and any other suitable data. The virtual sublots 108-112 can be representative of the sublots being processed and can be employed to track data with respect to sublots subject to processing.

Typically, when the sublots are through with processing, it is undesirable to have data associated with each sublot. Rather, in most instances, it is desirable to perform tracking with the lot 104 as a whole. Accordingly, the tracking component 106 can include an aggregation component 302 that aggregates tracking data from the virtual sublots 108-112 to generate representative tracking data for the lot 104 as a whole. Therefore, for instance, raw materials tracked by way of the virtual sublots 108-112 can be aggregated to represent amount of raw materials utilized to create the entire lot 104. In another example, the virtual sublots 108-112 can be employed to track names of operators that are associated with the sublots represented by such virtual sublots 108-112. In some cases, different operators can be associated with similar processes—thus, a first sublot may be associated with a first operator while a second sublot may be associated with a second operator for a same process. The aggregation component 302 can aggregate such data so that each operator is associated with the lot 104 (and not with disparate sublots). In summary, control logics can be analyzed to aid in creating virtual sublots 108-112 that represent sublots being processed on a factory floor. Upon each sublot completing a particular process, the aggregation component 302 can automatically aggregate the virtual sublots 108-112 to obtain tracking data for the lot 104 in its entirety.

The tracking component 106 can additionally include a filter component 304 that is employed to filter data associated with sublots being processed on a factory floor. For example, a massive amount of data is generated during manufacture of items. In particular, states of sensors and actuators can be monitored, collected, and associated with a virtual sublot 108-112 if desired. Further, timing information associated with processes can be monitored and retained within virtual sublots 108-112. The filter component 304 can be utilized to selectively filter data from the factory floor so as not to render tracking data with respect to the lot 104 overwhelming. For instance, it may not be desirable to retain certain data with respect to particular sublots given a particular process, and the filter component 304 can filter such data from the virtual sublots 108-112. Additionally, the filter component 304 can employ location of one or more items when filtering data, wherein the location of the one of more items can be determined by a locator component 306. For example, an item, a skid of items, or the like can be associated with an RFID tag or other tag that enables location of items to be determined. The filter component 304 can then filter sensed data based at least in part upon the location. In a detailed example, when a skid is in a particular position on the factory floor, it may be undesirable to collect particular data with relation to the skid. Accordingly, the locator component 306 can determine that the skid is in a certain location and the filter component 304 can filter data that is associated with the virtual sublots 108-112 based at least in part upon the determined location.

Figure 4:
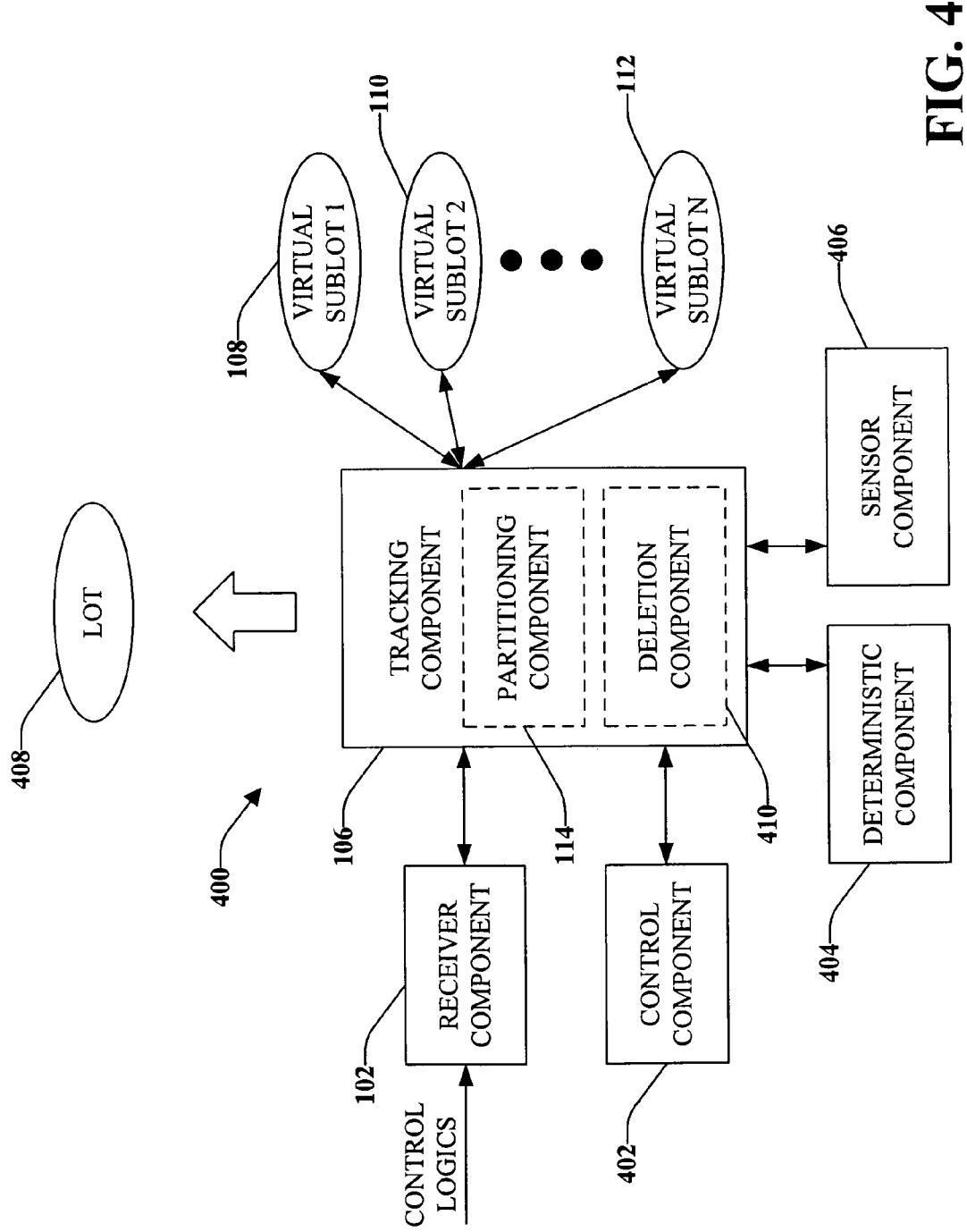
FIG. 4 illustrates an automatic tracking system including a control component that can re-allocate resources based at least in part upon tracking data.

Now referring to FIG. 4, a system 400 that facilitates tracking a lot of items as it is manufactured on a factory floor is illustrated. The system 400 includes the receiver component 102 that receives control logics utilized to control manufacture of the lot of items. The tracking component 106 analyzes the desirably created lot and the partitioning component 114 (which is associated with the tracking component 106) automatically creates the plurality of virtual sublots 108-112 that represent sublots on the factory floor. The tracking component 106 can then track the sublots and associate data from the sublots (e.g., raw materials, inventory, temperatures, location, . . . ) with the virtual sublots 108-112.

The system 400 can additionally include a control component 402 that can analyze data associated with the virtual sublots 108-112 and allocate resources based at least in part upon the analysis. For example, first and second lines on a factory floor may have capabilities for creating substantially similar items. In certain instances, to reduce cost or due to lack of need for running of both lines, only the first line may be run (and thus the tracking component 106 tracks the lot of items with respect to the first line). The control component 402 can be communicatively coupled to the tracking component 106 to ensure that throughput is as expected, and if not, can cause the second line to aid in production of the lot of items. While lines are utilized as an example, it can be discerned by one skilled in the art that the control component 402 can allocate resources between machines, factories, and the like to facilitate efficient manufacture of the lot of items. If resources are reallocated, the partitioning component 114 can create additional virtual sublots that effectively represent sublots on the factory floor. The tracking component 106 can then track the sublots as before. In other words, the tracking component 106 can continue to track a lot of items even if control of the manufacturing process is altered.

The system 400 can further include a deterministic component 404 that automatically determines when a sublot has completed a certain process. For instance, sensors associated with a mixing process can output particular signals upon the mixing process completing. The deterministic component 404 can monitor output of the sensors to automatically determine when such process is complete. In another example, a timer can be employed in connection with an oven, wherein items must reside in the oven for a certain amount of time. The deterministic component 404 can analyze a timer and automatically determine when the heating process is complete. Additionally or alternatively, the system 400 can include a sensor component 406 that can be employed to determine when an operator deems a process complete. For example, an operator can depress a button, pull a lever, or the like, wherein such action indicates that a process has completed. Determining when processes are complete can aid the tracking component 406 in connection with tracking the virtual sublots 108-112, as sublots are tracked with respect to particular processes. Thus, if a sublot completes a process, the tracking component 106 can be made aware by the deterministic component 404 and/or the sensor component 406 of completion of a process, and can have knowledge that the sublot is to be associated with a next process in a sequence. Thus, the virtual sublots 108-112 can be effectively employed to track sublots on a factory floor.

The tracking component 106 can additionally include the aggregation component 302 (FIG. 3) that aggregates data from the virtual sublots 108-112 to create a virtual lot 408, wherein the virtual lot 408 includes data representative of a manufactured lot of items. Once data associated with the virtual sublots 108-112 has been aggregated, however, it is not desirable to retain the virtual sublots 108-112. Therefore, the tracking component 106 can include a deletion component 410 that automatically deletes the virtual sublots 108-112 after the virtual lot 408 has been created. Accordingly, once a lot of items has been manufactured, the tracking component 106 can output the virtual lot 408, which includes relevant data relating to the lot of items.

Figure 5:
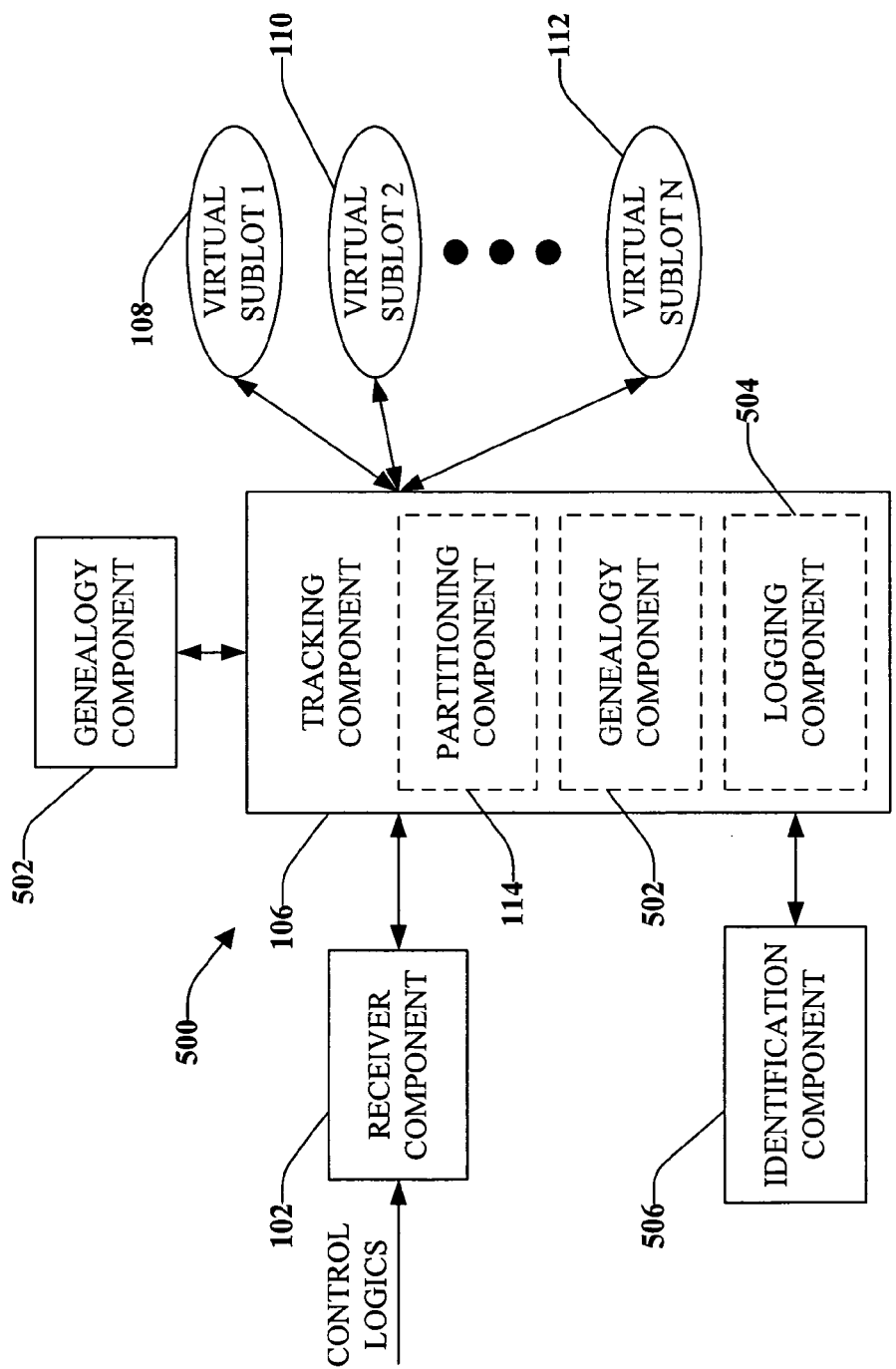
FIG. 5 illustrates an automatic tracking system that can generate audit logs.

Turning now to FIG. 5, an industrial tracking system 500 is illustrated. The system 500 includes the receiver component 102 that receives control logics that are employed to control a manufacturing process. The tracking component 106 analyzes the control logics for data relating to a lot of items being produced, and the partitioning component 114 associated with the tracking component 106 automatically creates the plurality of virtual sublots 108-112 that represent/track sublots on the factory floor. The tracking component 106 can additionally include a genealogy component 502 that can create genealogy information with respect to a lot of items being manufactured. For example, genealogy information is often required by regulatory agencies, such as the Food and Drug Administration. The tracking component 106 can additionally include a logging component 504 that can create audit logs with respect to the lot of items and/or sublots arising therefrom. For instance, an audit log can include timing information, materials information, operator information, and any other suitable information that should be within audit logs. Additionally, an identification component 506 can be employed to determine identification of one or more operators that is associated with the lot of items. For example, the identification component 506 can analyze usernames, passwords, personal identification numbers, biometric indicia, key cards, or any other suitable identifying indicia. Identities of operators can thereafter be placed in audit logs created by the logging component 504.

Figure 6:
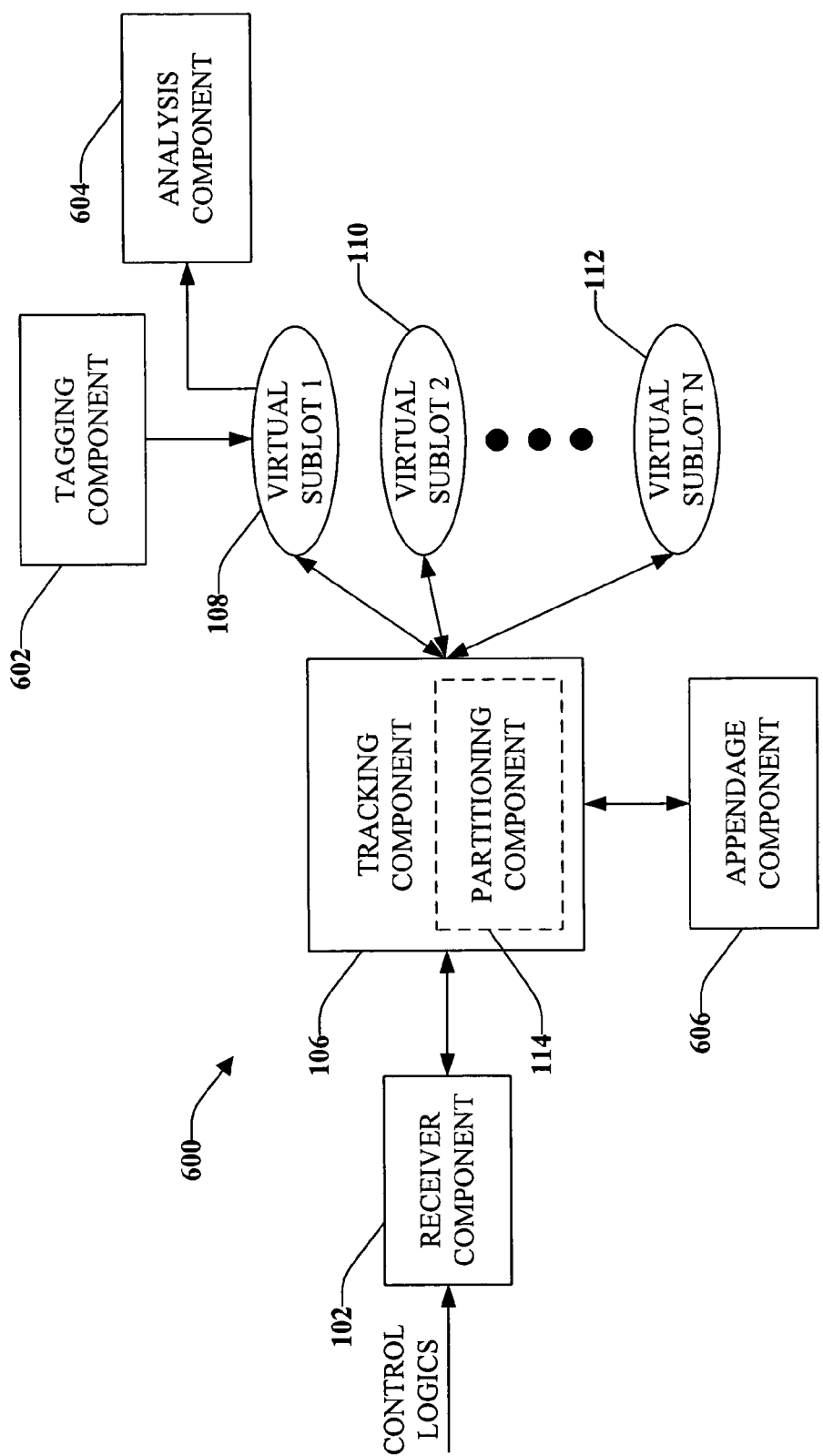
FIG. 6 illustrates a tracking system that includes serialized tracking capabilities.

Now referring to FIG. 6, a tracking system 600 for utilization in an industrial environment is illustrated. The tracking system 600 includes the receiver component 102 that receives control logics that are employed to control manufacture of a lot of items. For instance, the receiver component 102 can be communicatively coupled to one or more controllers (e.g., programmable logic controllers) and can receive the control logics therefrom. For example, the receiver component 102 can aggregate control logics form a plurality of controllers, and relay such control logics to the tracking component 106. The tracking component 106 can analyze the control logics to determine size of a lot, size of sublots, and the like, and the partitioning component 114 can then be employed to automatically create the virtual sublots 108-112 that represent sublots on a factory floor.

The system 600 can additionally include a tagging component 602 that provides a tag to each virtual sublot 108-112 such that the virtual sublots 108-112 can be differentiated upon data relating to such sublots 108-112 being aggregated. For example, each sublot on the factory floor can be associated with one or more tags, such as RFID tags or barcodes, that can uniquely identify the sublots. These tags can then be utilized by the tagging component 602 to uniquely identify each virtual sublot (e.g., in the instance that serialized tracking is desired). An analysis component 604 can then be utilized to analyze the tags during aggregation of virtual sublots 108-112 to enable serialized tracking of such sublots. For example, with aid of tags provided by the tagging component 602, the analysis component 604 can be utilized to determine when in time certain events happened with respect to particular sublots.

The tracking component 106 can also be associated with an appendage component 606 provides an indication to the tracking component 106 regarding when a sublot begins a transport and when the sublot completes the transport with respect to disparate processes. For instance, sublots may be moved by conveyor, crane, automobile, or the like between processes. If time between beginning and completing a transport goes above a threshold, then an alarm can be generated and a notation can be made within a corresponding virtual sublot. If and when data relating to the virtual sublots 108-112 is aggregated, the transport data can be retained within such aggregated data.

Data generated by the tracking component 106 and associated with the virtual sublots 108-112 can accord to a hierarchically structured data model. For instance, the data model can be based at least in part upon ISA S88 and/or ISA S95. It is understood, however, that any suitable standard can be employed in connection with data created by the tracking component 106. Additionally, controllers on the factory floor can receive, interpret, and output data that conforms to this hierarchically structured data model, thereby enabling such data model to be employed across system/process boundaries.

Figure 7:
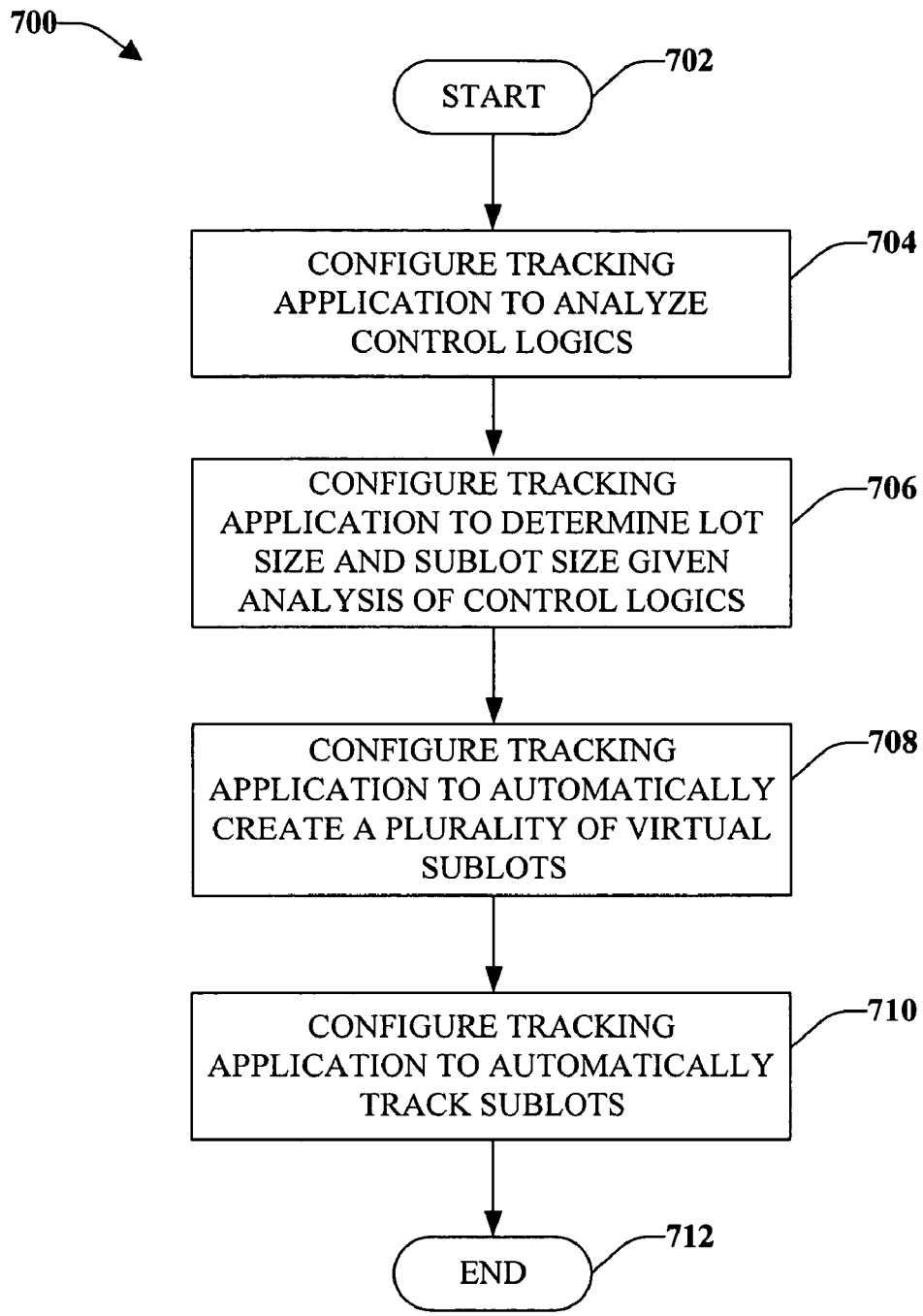
FIG. 7 is a representative flow diagram of a methodology for configuring a tracking application to automatically track a lot of items during manufacture of the lot of items.
Figure 8:
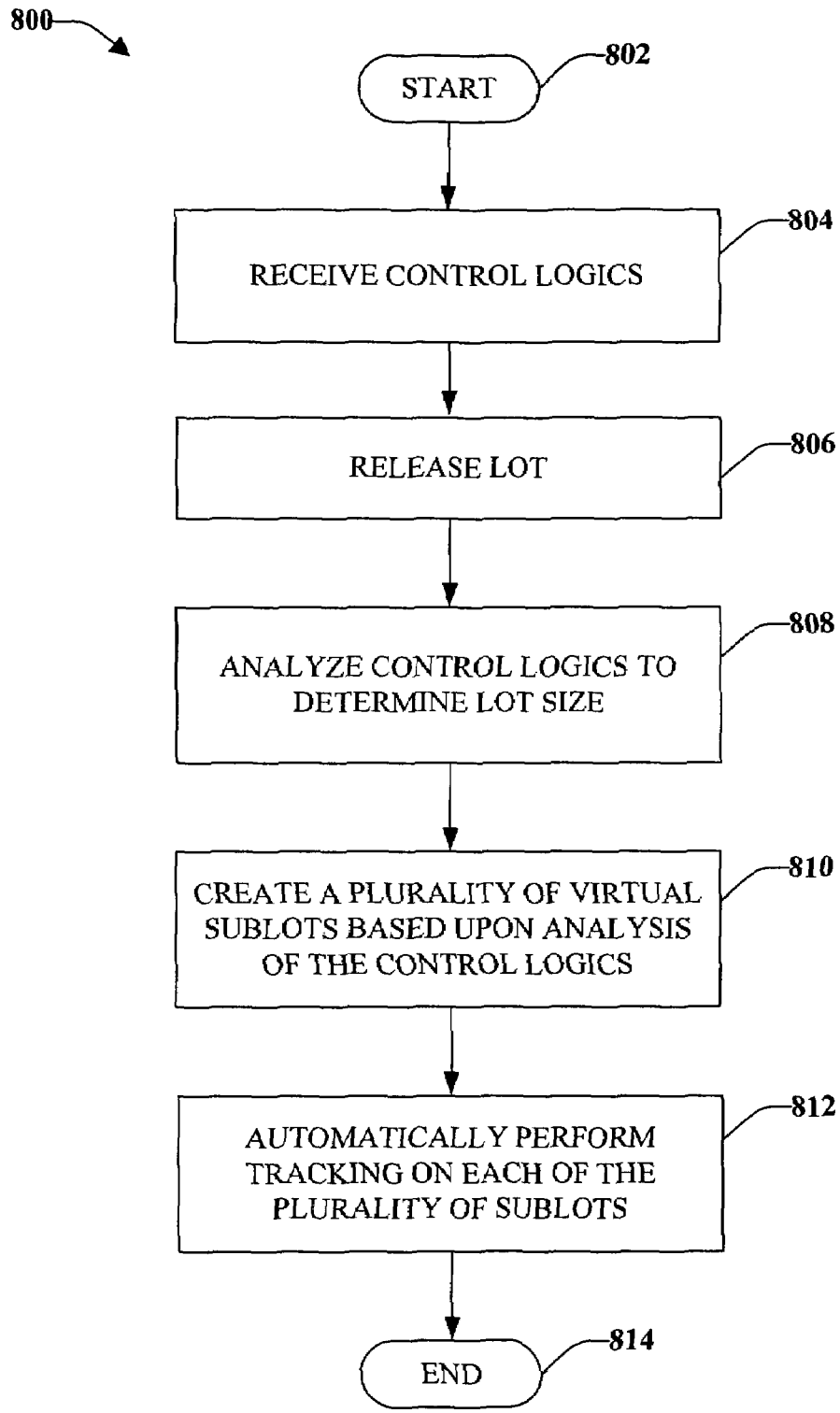
FIG. 8 is a representative flow diagram of a methodology for automatically tracking a lot of items on a factory floor.
Figure 9:
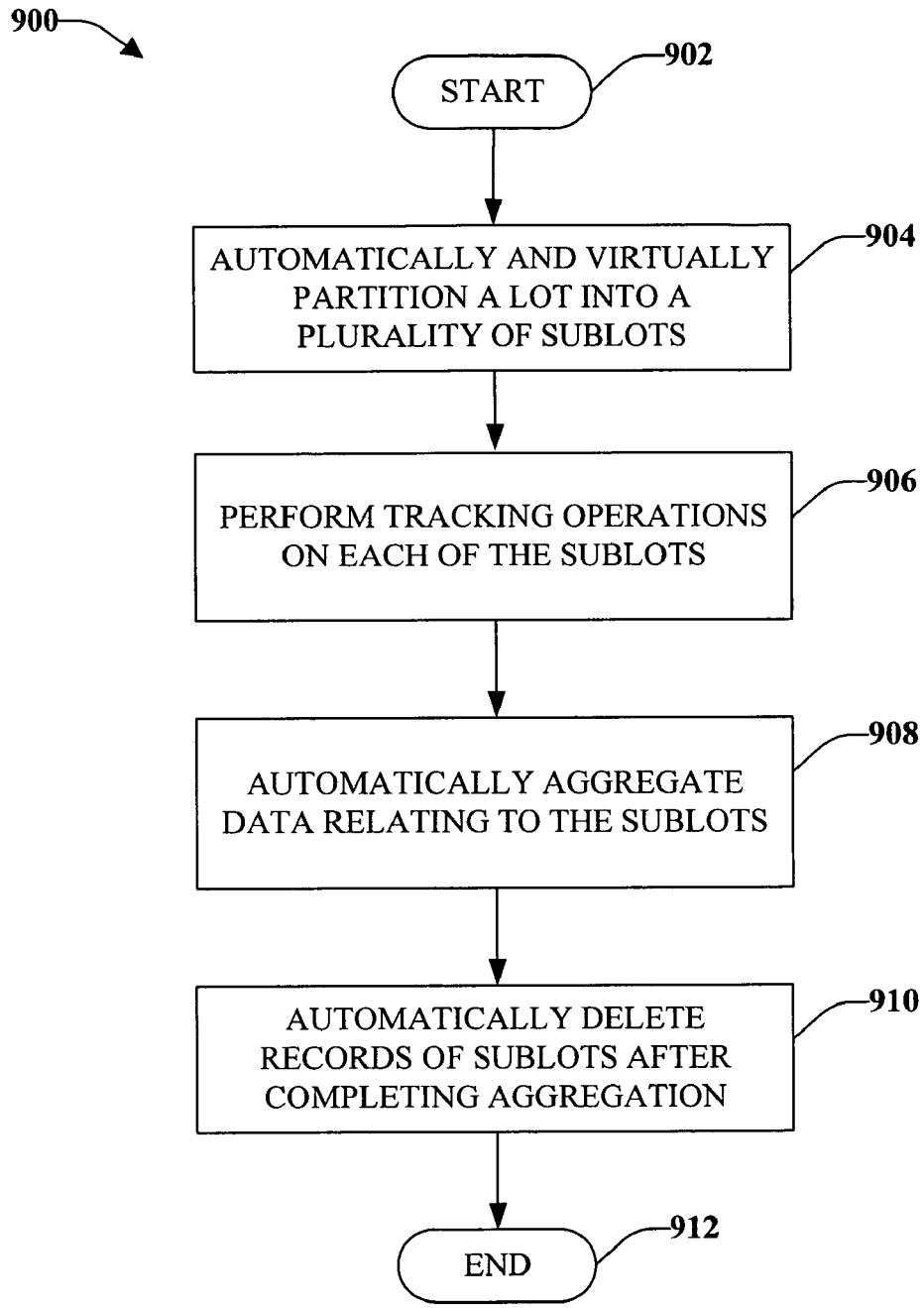
FIG. 9 is a representative flow diagram of a methodology for creating virtual sublots that can be employed in connection with tracking sublots on a factory floor.

Referring to FIGS. 7-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 7, a methodology 700 for configuring an application to automatically perform tracking with respect to sublots on a factory floor is illustrated. The methodology 700 starts at 702, and at 704 a tracking application is configured to analyze control logics that are utilized to control manufacture of items within a factory. While the term "control logics" has been utilized herein, it is understood that such term is intended to encompass control systems, control processes, and any other similar systems/processes. For example, the tracking application can receive control logics from one or more data stores, such as a server. Additionally or alternatively, the tracking application can receive control logics from controllers on the factory floor. Any suitable manner of receiving and analyzing control logics is contemplated and intended to fall under the scope of the hereto-appended claims.

At 706, the tracking application is configured to determine a size of a lot and sublot sizes given the analysis of the control logics. For example, a lot size can be specified in a work order which can be analyzed by the tracking application. It is understood, however, that a lot size does not need to correspond precisely to a work order, as a work order can include numerous lots, and if a part of a lot is scrapped the lot will not correspond precisely to the work order. Additionally, the control logics can be configured to control manufacture of a certain number of items specified in the work order, and upon analysis of the control logics such lot size can be determined. Similarly, size of sublots can also be ascertained upon analysis of the control logics, as the control logics can be informative as to possible bandwidth of particular processes. The size of sublots, then, is a function of the bandwidth of each process utilized in connection with manufacturing the lot of items.

At 708, the tracking application is configured to automatically create a plurality of virtual sublots that correspond to sublots on the factory floor. For example, when a lot is released for processing, several sublots are created that are transported through the factory. The tracking application can determine the size of the lot and the size of each sublot and can create virtual sublots that represent the sublots on the factory floor. At 710, the tracking application can be configured to automatically track the sublots. For example, as a chemical is added to a sublot, the tracking application can monitor an amount of the chemical added and associate that with the virtual sublot that tracks the sublot on the factory floor. In another example, a sublot may be subject to heating in an oven, and the tracking application can automatically track temperature and time within the oven and associate such information with a virtual sublot representing such sublot on the factory floor. The methodology 700 then completes at 712.

Turning now to FIG. 8, a methodology 800 for tracking a plurality of sublots as they move through a factory is illustrated. The methodology 800 begins at 802, and at 804 control logics (or control systems, process, . . . ) are received. At 806, a lot is released per the control logics. For example, a work order may be received for manufacture of one thousand items, and control logics can be configured to effectuate manufacture of such items. At 808, the received control logics are analyzed to determine a size of the lot. Continuing with the above example, the control logics can be analyzed to determine that one thousand items are desirably manufactured.

At 810, a plurality of virtual sublots are created that map to sublots on the factory floor. In more detail, manufacture of items typically involves several processes to be undertaken in a certain sequence, wherein at least one of such processes is associated with finite bandwidth. For example, a mixing application may only be able to mix chemicals needed for manufacture of one hundred items (rather than one thousand). Thus, ten sublots must be created, wherein each sublot eventually is associated with one hundred manufactured items. Accordingly, ten virtual sublots can be created that represent the ten sublots. At 812, tracking on each of the plurality of sublots is performed, and tracking data is associated with each of the virtual sublots. The methodology 800 then completes at 814.

Referring now to FIG. 9, a methodology 900 for automatically tracking a lot of items in an industrial environment is illustrated. The methodology 900 starts at 902, and at 904 a plurality of virtual sublots that represent a plurality of sublots on a factory floor are created. For instance, a control system utilized to manufacture a lot of items can be analyzed to determine a size of sublots and a number of sublots that will be on the factory floor and virtual sublots can be automatically created that map to the sublots on the factory floor. At 906, tracking is performed with respect to each sublot on the factory floor such that data is associated with the virtual sublots. For example, inventory can be tracked with respect to each sublot. At 908, data associated with the virtual sublots is automatically aggregated, thereby enabling tracking data to exist with respect to an entire lot of items (rather than sublots that make up the lot). At 910, the virtual sublots can be automatically deleted after aggregation of data associated therewith, leaving tracking data associated with the lot as a whole. This data can then be, for example, utilized for invoices, ordering, and the like. The methodology 900 then completes at 912.

Figure 10:
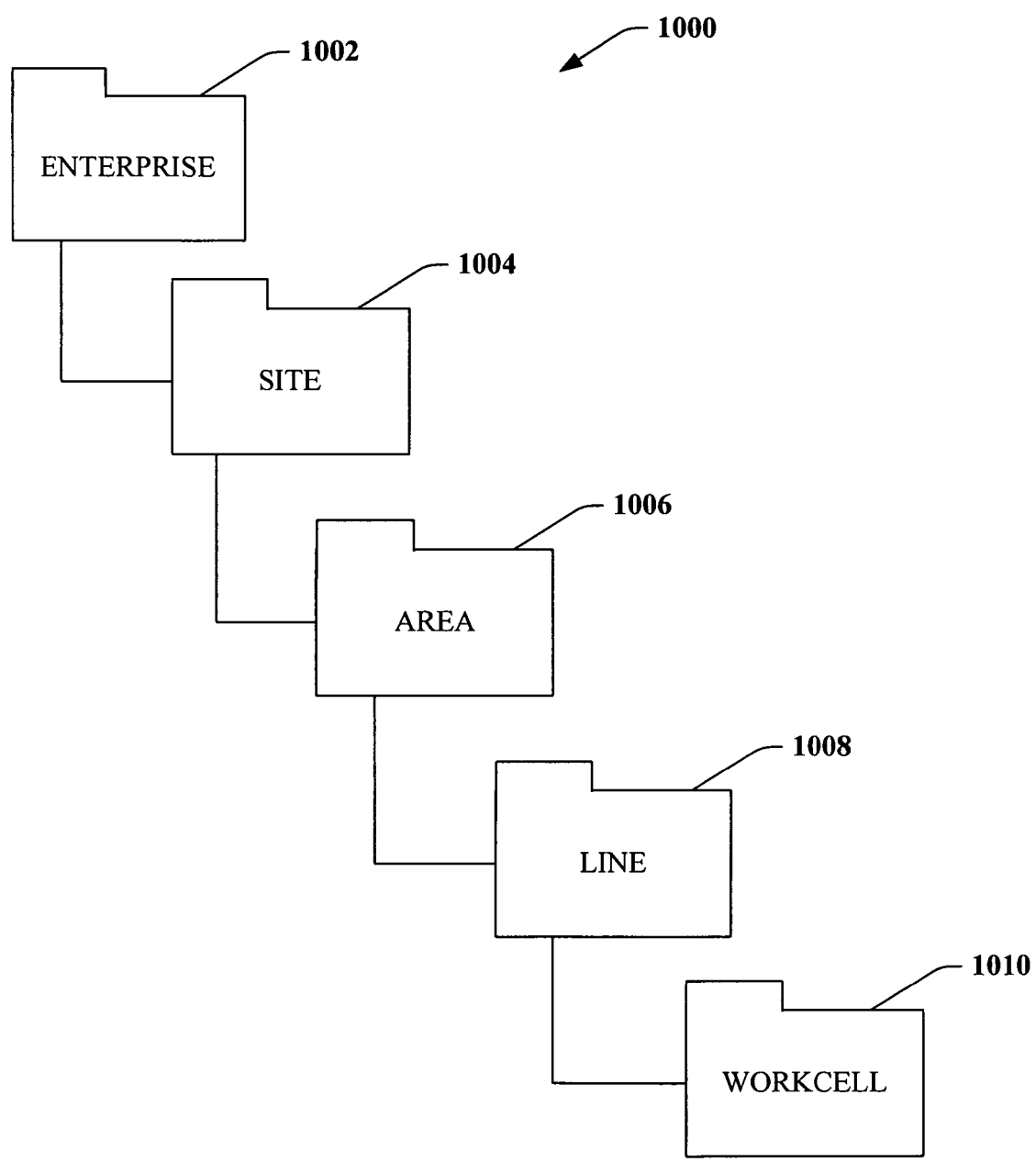
FIG. 10 is an exemplary hierarchical structure upon which a data model can be based, wherein tracking data can conform to the data model.

Referring now to FIG. 10, an exemplary hierarchical structure 1000 which can be utilized in connection with the hierarchically structured data model alluded to herein is illustrated. For example, the data model can facilitate nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 level can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000. Thus, data created during tracking of a sublot can be quite robust, enabling a human or machine analyzing the data to quickly ascertain a great level of detail regarding the sublot and/or a lot.

Figure 11:
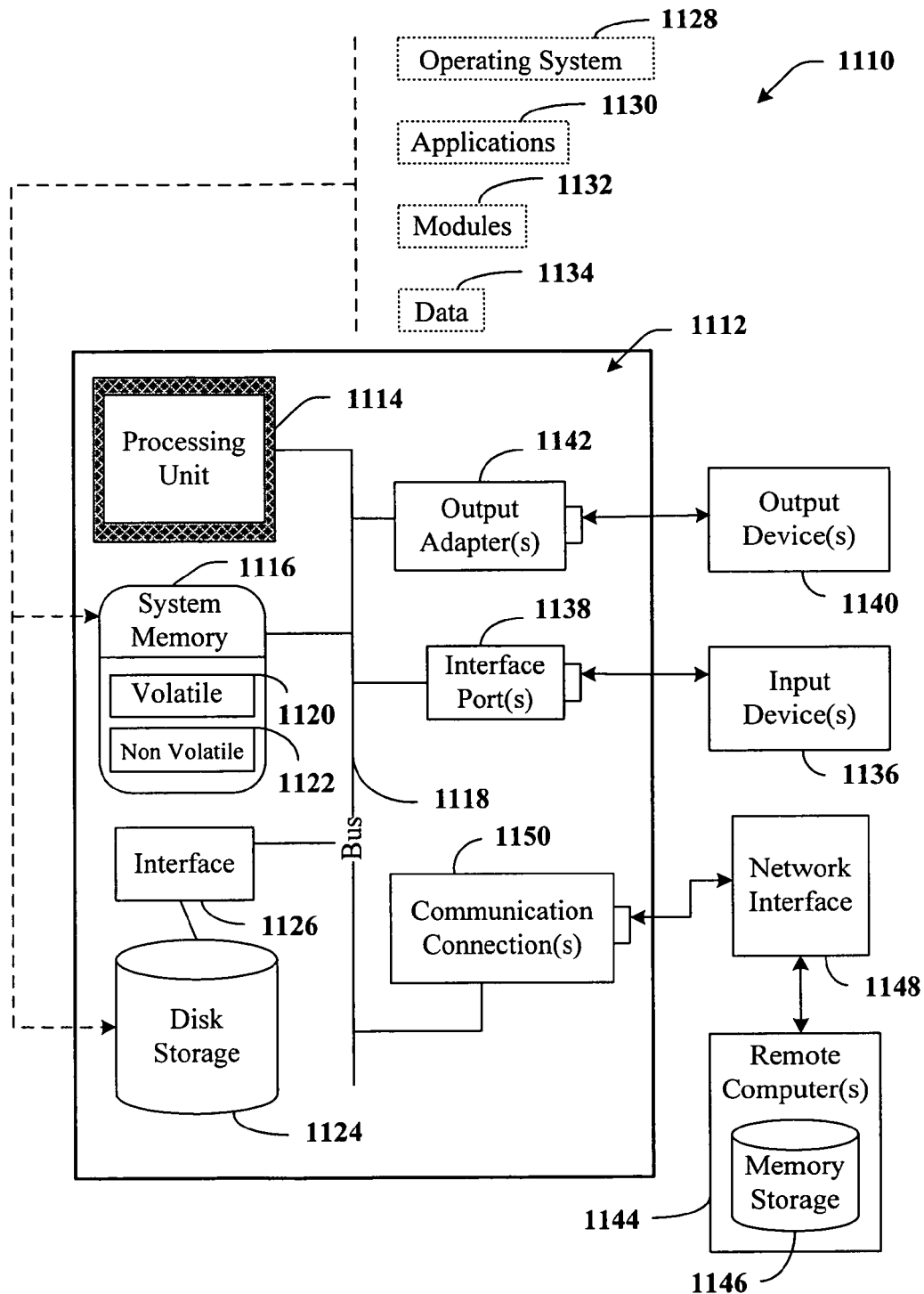
FIG. 11 is an exemplary computing environment that can be utilized in connection with the claimed subject matter.

With reference to FIG. 11, an exemplary environment 1110 for implementing various aspects of the claimed subject matter, including tracking sublots upon a factory floor, includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
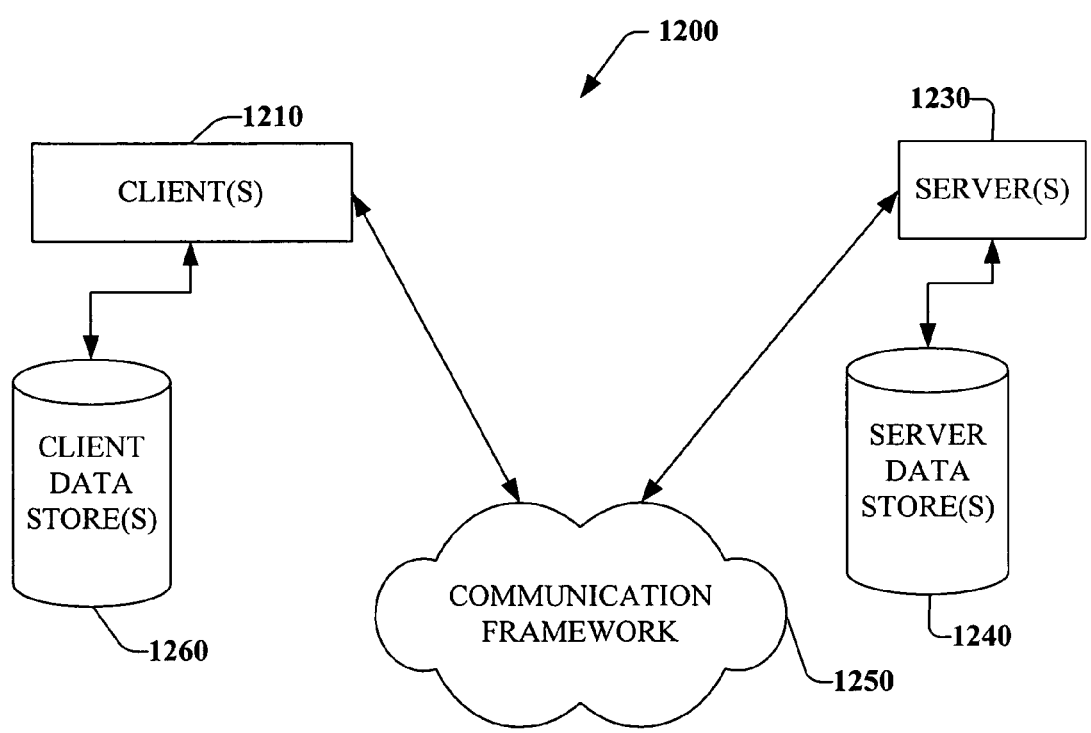
FIG. 12 is an exemplary networking environment that can be utilized in connection with the claimed subject matter.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that tracks a parent lot of items being manufactured, comprising the following computer executable components that are stored on a computer readable medium:
   a receiver component that receives control logics for manufacturing a parent lot that includes one or more sublots, the sublots include a plurality of items being manufactured and the control logics includes information relating to a control system, a control process, a bandwidth of a control system, and a bandwidth of a control process;
   a tracking component that performs an analysis on the control logics, automatically tracks each of the sublots across multiple processes during manufacture of the items and associates data from the sublots with a plurality of virtual sublots that represent the sublots being manufactured; and
   a partitioning component that determines a size of one or more of the sublots and a number of sublots the parent lot contains based at least in part on the analysis of the control logics and automatically creates the plurality of virtual sublots and further associates each of the sublots with the plurality of virtual sublots, wherein the number of virtual sublots created is equal to the number of sublots.

2. The system of claim 1, at least one item within the sublot is associated with a tag, the tag is at least one of a barcode or a Radio Frequency Identification tag (RFID tag).

3. The system of claim 1, the tracking component comprises an aggregation component that automatically combines the data corresponding to the virtual sublots that share the same parent lot upon a particular process completing operation on each of the sublots.

4. The system of claim 1, the tracking component tracks inventory with respect to items throughout a factory and further tracks orders with respect to the inventory.

5. The system of claim 1, tracking the sublots comprises at least one of determining that the sublots have begun an operation, the sublots have completed an operation, particular materials have been consumed, or particular materials have been produced.

6. The system of claim 1, further comprising a filtering component that selectively filters the data associated with the virtual sublot based at least in part upon a state of a tag associated with the sublot.

7. The system of claim 6, further comprising a locator component that locates a geographic position within a factory of at least one of the sublots.

8. The system of claim 7, the filter component utilizes the geographic position to selectively filter the data.

9. The system of claim 1, further comprising a control component that re-allocates manufacturing resources based at least in part upon data associated with the virtual sublots.

10. The system of claim 1, the tracking component comprises a deletion component that automatically deletes the virtual sublots upon the parent lot of items being manufactured past a particular process.

11. The system of claim 1, the number of items within the parent lot is based at least in part upon content of a work order.

12. The system of claim 1, further comprising a deterministic component that automatically determines when a process has been completed with respect to the sublot.

13. The system of claim 1, further comprising a logging component that collects data relating to the sublot and creates an audit trail with respect to the sublot.

14. The system of claim 1, further comprising a genealogy component that creates genealogy information for regulatory applications with respect to at least one of the sublot or the parent lot of items.

15. The system of claim 1, further comprising a tagging component that tags the virtual sublots based at least in part upon at least one of a Radio Frequency Identification tag (RFID tag) or a barcode.

16. The system of claim 15, further comprising an analysis component that analyzes the tags to enable serialized tracking with respect to the virtual sublots.

17. The system of claim 1, further comprising an appendage component that notates at least one of when a transport starts or when a transport completes with respect to the sublot.

18. The system of claim 17, the appendage component determines at least one of when the transport starts or when the transport completes through a tag associated with the sublot.

19. The system of claim 1, the data generated by the tracking component conforms to a hierarchically structured data model, the hierarchically structured data model according to at least one of ISA S88 or ISA S95, where ISA is an Industrial Standard Architecture.

20. The system of claim 1, wherein the virtual sublots are representative of the sublots being manufactured and the tracking component employs the virtual sublots to track data with respect to the sublots being manufactured.

21. The system of claim 1, wherein the tracking component monitors and tracks amount of raw materials utilized, timing associated with the processes and amount of additives utilized in connection with processing the items.

22. The system of claim 1, wherein the tracking component employs the virtual sublots to track operators that are associated with the sublots represented by the virtual sublots.

23. The system of claim 1, wherein the tracking component monitors an amount of chemical added to a sublot by associating the chemical added with the virtual sublot that tracks the sublot on the factory floor.

24. The system of claim 1, wherein the tracking component automatically tracks temperature and time for a sublot within a heating oven by associating the temperature and time with a virtual sublot that represents the sublot on the factory floor.

25. A methodology for tracking inventory within an industrial environment, comprising:
   receiving a control system that controls manufacturing of a parent lot that includes one or more sublots, the sublots include a plurality of items being manufactured and the manufacturing of the items includes a plurality of process steps, the control system includes information relating to a control system, a control process, a bandwidth of a control system, and a bandwidth of a control process;
   performing an analysis on the control system information to determine a size of the sublot and a number of sublots the parent lot contains;
   automatically creating a plurality of virtual sublots based upon the number of sublots and associating each of the sublots with the plurality of virtual sublots that represent the sublots being manufactured on a factory floor; and
   automatically tracking each of the sublots across multiple processes during manufacturing of the items based at least in part on associating data from the sublots with the virtual sublots.

26. The methodology of claim 25, further comprising automatically aggregating the data corresponding to the virtual sublots.

27. The methodology of claim 25, further determining the size of the sublot and the number of sublots as a function of bandwidth of the control processes and the control systems.

28. The methodology of claim 25, further comprising:
   associating the sublot with a tag;
      reading the tag to determine a location of the sublot within a factory by employing the virtual sublot to track the location of the sublot.

29. The methodology of claim 28, further comprising generating an audit trail that includes at least one of a determined location, an operator identity, a date associated with an event, or a time associated with an event.

30. The methodology of claim 25, further comprising automatically tracking material usage through the virtual sublots as the corresponding sublots are subject to the process steps.

31. The methodology of claim 25, further comprising automatically determining when the sublot completes a particular process step.

32. A computer implemented industrial inventory/material tracking system, comprising the following computer executable means that are stored on a computer readable medium:

means for determining a parent lot that includes one or more sublots, the sublots include a plurality of items being manufactured;

means for determining a size of the sublot and a number of sublots to be created per parent lot of items based at least in part on information relating to a control system, a control process, a bandwidth of a control system, and a bandwidth of a control process;

means for automatically creating a plurality of virtual sublots and associating each of the sublots with the plurality of virtual sublots that represent the sublots being manufactured on a factory floor;

means for automatically tracking each of the sublots across multiple processes on the factory floor based at least in part on associating data from the sublots with the virtual sublots; and means for automatically aggregating data associated with the virtual sublots that share the same parent lot and associating the aggregated data with the parent lot that the sublots have in common.

* * * * *